(12) United States Patent
Minamino et al.

(10) Patent No.: US 6,619,859 B1
(45) Date of Patent: Sep. 16, 2003

(54) RECEPTACLE MODULE

(75) Inventors: Masayuki Minamino, Chiba (JP);
Masayuki Iwase, Ichihara (JP);
Hiroyuki Yamada, Ichihara (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 41 days.

(21) Appl. No.: 09/616,706

(22) Filed: Jul. 14, 2000

(30) Foreign Application Priority Data

Jul. 19, 1999 (JP) .......................................... 11-204849

(51) Int. Cl.[7] .................................................. G02B 6/36
(52) U.S. Cl. ............................. 385/92; 385/53; 439/374
(58) Field of Search ............................... 385/53, 55, 60, 385/91, 92, 93, 73, 76, 78, 88; 439/68, 70, 329, 374

(56) References Cited

U.S. PATENT DOCUMENTS

| | | |
|---|---|---|
| 5,390,270 A | 2/1995 | Hideyuki et al. |
| 5,960,141 A * | 9/1999 | Sasaki et al. ................. 385/88 |
| 6,095,695 A * | 8/2000 | Ohtsuka et al. ............... 385/72 |
| 6,135,644 A * | 10/2000 | Hakogi et al. ................ 385/92 |
| 6,213,651 B1 * | 4/2001 | Jiang et al. .................... 385/92 |
| 6,247,851 B1 * | 6/2001 | Ichihara ..................... 385/92 X |

FOREIGN PATENT DOCUMENTS

| | | |
|---|---|---|
| JP | 60-6107 | 1/1985 |
| JP | 02-093413 | 4/1990 |
| JP | 03-167510 | 7/1991 |
| JP | 3-102750 | 10/1991 |
| JP | 5-48365 | 6/1993 |
| JP | 06-204566 | 7/1994 |
| JP | 07-209553 | 8/1995 |
| WO | WO 98/36305 | 8/1998 |

* cited by examiner

*Primary Examiner*—Tulsidas Patel
*Assistant Examiner*—Son V. Nguyen
(74) *Attorney, Agent, or Firm*—Knobbe, Martens, Olson & Bear, LLP

(57) ABSTRACT

A receptacle module comprises an optical module having a photoelectric converting capability and a receptacle to be used for connecting the optical module to an optical connector. The receptacle has a positioning portion for positioning the optical module and an engagement portion for detachably holding the optical module by engagement.

11 Claims, 7 Drawing Sheets

RECEPTACLE MODULE

BACKGROUND OF THE INVENTION

1. Field of the Invention

The present invention relates to a receptacle module comprising an optical module having a photoelectric converting capability and a receptacle which is used for connecting the optical module to an optical connector.

2. Description of Related Art

Conventional connection of an optical module and an optical connector in a detachable manner is accomplished by employing a so-called receptacle module structure which has a receptacle integrally provided on an optical module.

From the viewpoint of the down-sizing demand, an optical module which is the integration of various kinds of optical components has been used in optical communications, but simple connection to the optical connector has been studied.

However, an optical module designed to be integral with the receptacle suffers its large size on a production line on which it is mounted on a printed wiring board, and a complicated structure on the receptacle portion to which the optical connector is to be connected. This makes the optical module hard to process.

As a solution, a receptacle which is manufactured independently and separately from an optical module may be securely adhered to the optical module. This scheme however requires a step of curing an adhesive, thus disabling prompt use of the final product.

SUMMARY OF THE INVENTION

It is an object of the present invention to provide a compact receptacle module with a simple structure, which has an optical module and a receptacle, ensures easy detachable connection between them, and permits either one of the optical module and receptacle, whichever fails, to be replaced with a new one.

To achieve this object, according to this invention, there is provided a receptacle module comprising an optical module having a photoelectric converting capability and a receptacle to be used for connecting the optical module to an optical connector, the receptacle having a positioning portion for positioning the optical module and an engagement portion for detachably holding the optical module by engagement.

The receptacle module of this invention is used at the time of connecting an optical connector and an optical module in a detachable manner, ensures easy detachable connection therebetween, permits either one of the optical module and receptacle, whichever fails, to be replaced with a new one, and has a compact and simple structure.

It is preferable that the positioning portion has a first positioning member for positioning the optical module, the first positioning member extending from both widthwise-directional sides of the receptacle along a direction of connection between the optical connector and the optical module. This structure is preferable in achieving the above object because the optical module of the receptacle module is positioned by the first positioning member with respect to the widthwise direction of the receptacle.

It is preferable that the first positioning member is provided as part of a side portion of the receptacle and is partly separated from a main body of the receptacle by a slit provided along an attaching and detaching direction of the optical module. This structure is advantageous in achieving the above object because the slit makes the first positioning member of the receptacle module easier to be opened or closed in the widthwise direction.

It is further preferable that the engagement portion is formed on the first positioning member. This structure is advantageous in achieving the above object as the receptacle module can simultaneously accomplish the positioning of the optical module by the first positioning member and the engagement of the optical module by the engagement portion.

It is preferable that the positioning portion has a second positioning member extending from a bottom portion of a main body of the receptacle and the optical module is positioned between the first and second positioning members. As this receptacle module allows the optical module to be positioned below the receptacle in the height direction by the second positioning member, this structure is advantageous in achieving the above object.

It is preferable that the second positioning member is formed narrower than a width of the receptacle. This structure can make the receptacle module more compact and is thus preferable in the sense of achieving the above object.

It is preferable that the positioning portion is provided with guide means along an attaching and detaching direction of the optical module and the optical module is provided with to-be-guided means to be fitted in the guide means. This structure of the receptacle module can permit the optical module to be smoothly guided in the lengthwise direction by the fitting of the guide means and the to-be-guided means, and is therefore preferable in achieving the aforementioned object.

It is preferable that the optical module is provided with an engagement-portion mating portion for engaging with the engagement portion. With this structure, the strength of engagement between the receptacle and the optical module of the receptacle module is improved by the engagement-portion mating portion. This structure is therefore advantageous in achieving the aforementioned object.

It is preferable that the receptacle module further includes a cover to be engaged with the receptacle, which cover comprises side plates for covering the first positioning member from both widthwise-directional sides, a top plate for covering a top portion of the first positioning member, and a rear plate for covering a distal end portion of the first positioning member, and with the optical module held between the first and second positioning members, the first positioning member and the optical module are covered with the cover, and with the cover engaged with the receptacle, the optical module is held positioned with respect to the receptacle.

As this structure of the receptacle module shields the optical module into the receptacle using the cover, the optical module can be held more surely than the receptacle. This is advantageous in achieving the aforementioned object.

It is preferable that the side plates have slits formed in a height direction. With this structure, the slits permit the side plates of the cover to be easily opened and closed in the widthwise direction. This makes it easier to remove the cover from the main body of the receptacle, which is preferable in achieving the aforementioned object.

It is preferable that a heat discharging portion of a thermal conductive material is provided on at least part of the cover and the heat discharging portion and the optical module are secured in contact with each other. This structure can permit the receptacle module to efficiently discharge the heat, generated in the optical module, outside. This feature is preferable in maintaining the performance of the optical module.

It is preferable that the optical module has a protruding portion having an end face to be optically coupled to the optical connector, and the receptacle has a positioning member, as the positioning portion, for positioning the optical module and an inserting portion formed inside, which is to be fitted over the protruding portion, and the receptacle and the optical module are positioned by the positioning member and the optical module and are positioned more accurately by the protruding portion fitted into the inserting portion. This structure of the receptacle module can allow the optical module to be positioned precisely with respect to the receptacle. At the time the optical module is connected to the optical connector, therefore, high-precision optical coupling can be realized, thus contributing to an improvement of the performance.

The aforementioned object, other objects, features and advantages of the present invention will be more readily appreciated by reference to the following detailed description taken in conjunction with the accompanying drawings.

DETAILED DESCRIPTION OF THE PREFERRED EMBODIMENTS

Preferred embodiment of the present invention will now be described in detail referring to FIGS. 1 to 11B.

Figure 1:
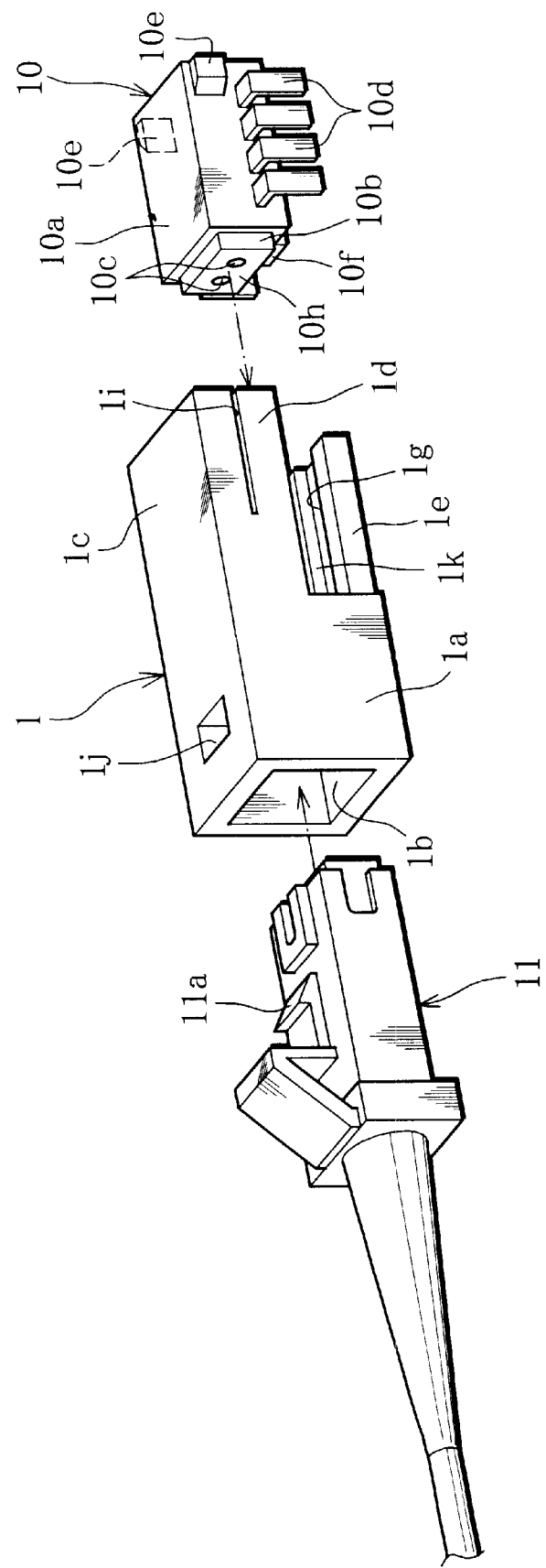
FIG. 1 is a perspective view of a receptacle module according to a first embodiment of this invention, illustrating how to insert an optical module from the receptacle side.
Figure 2:
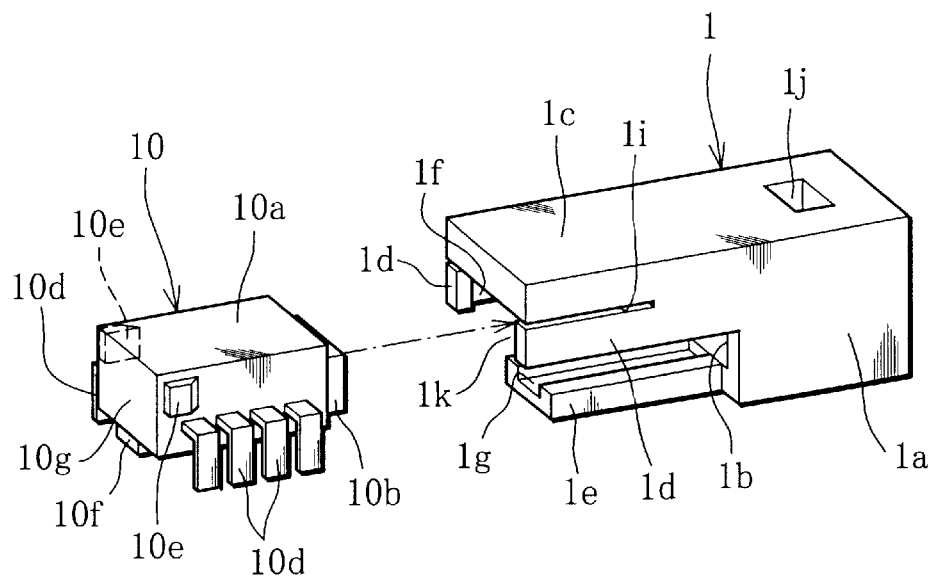
FIG. 2 is a perspective view of the receptacle module in FIG. 1 as seen from the optical module side.

A receptacle module according to the first embodiment as a receptacle 1 and an optical module 10 shown in FIGS. 1 and 2.

The receptacle 1, which is formed of a synthetic resin such as PPS (polyphenylene sulfide) by molding, is used to connect the optical module 10 to an optical connector 11 as shown in FIG. 1. As shown in FIGS. 1 and 2, the receptacle 1 has an inserting portion 1b formed in the center of a main body 1a which is formed into a rectangular cylindrical shape by molding. The optical connector 11 is to be fitted into this inserting portion 1b. A protruding portion 10b of the optical module 10, which will be discussed later, is to be fitted into the opposite side of the inserting portion 1b to the side where the optical connector 11 is to be fitted. The receptacle 1 has a top plate 1c, side guides 1d and a bottom guide 1e provided on the main body 1a integrally along the direction of connection between the optical connector 11 and the optical module 10, i.e., along the lengthwise direction. The top plate 1c extends from the top portion of the main body 1a. The side guides 1d extend from the two widthwise sides of the main body 1a. The bottom guide 1e extends from the bottom portion of the main body 1a. The top plate 1c, the side guides 1d and the bottom guide 1e form an inserting portion 1k which is the space where the optical module 10 is to be inserted. The optical connector 11 and the optical module 10 are accurately positioned as they are respectively inserted into the inserting portions 1b and 1k.

The top plate 1c, the side guides 1d and the bottom guide 1e guide, position and hold the optical module 10 at the time the optical module 10 is attached to the receptacle 1. Each side guide 1d is provided as part of the associated side of the main body 1a and serves as a first positioning member. Each side guide 1d has a slit 1i formed therein along the direction of the connection of the optical module 10. This slit 1i separates part of the associated side guide 1d from the top plate 1c, providing a certain degree of freedom in the fitting width for the optical module 10 which is defined by both side guides 1d. Each side guide 1d has a recessed engagement portion 1f formed in the inner distal end portion. This engagement portion 1f engages with an associated projection 10e (which will be discussed later) formed on the optical module 10. As shown in FIGS. 1 and 2, the bottom guide 1e has a recess 1g formed in the top center portion along the lengthwise direction. This recess 1g serves as a second positioning member. The bottom guide 1e is formed narrower than the main body 1a so that at the time the optical module 10 is attached or detached, leads 10d protruding on both widthwise sides of the optical module 10 do not touch the bottom guide 1e. The receptacle 1 has an engagement hole 1j formed in the top of the main body 1a where a projection 11a of the optical connector 11, which will be discussed later, is engaged.

The optical module 10, which has a photoelectric converting capability, has a main body 10a made of plastic such as epoxy resin, a protruding portion 10b protruding from the distal end which is to be fitted in the receptacle 1, and two pin holes 10c formed in an optical coupling end face 10h of the front end face. The pin holes 10c are located on both widthwise sides of the protruding portion 10b. The protruding portion 10b has four optical fibers (not shown) exposed on the optical coupling end face 10h between the two pin holes 10c. The optical coupling end face 10h faces the end face of the optical connector 11 when the optical module 10 and the optical connector 11 are connected together via the receptacle 1. The main body 10a of the optical module 10 accommodates an optical part, such as a laser diode (LD) or photodiode (PD), which outputs an optical signal to the optical fibers, with the leads 10d extending from the sides of the main body 10a. The leads 10d are arranged at such positions that do not interfere with the side guides 1d and the bottom guide 1e when the main body 10a is fitted in the space formed by the top plate 1c, the side guides 1d and the bottom guide 1e.

The optical module 10 is provided with the projection 10e formed on either side of the main body 10a near a rear end face 10g thereof and a protruding portion 10f formed on the bottom center of the main body 10a in the lengthwise direction. Each projection 10e serves as an engagement-portion mating portion and the protruding portion 10f is to be fitted in the recess 1g of the receptacle 1.

The optical connector 11 is so designed as to be connected to the optical module 10 when fitted into the inserting portion 1b of the receptacle 1 as shown in FIG. 1, and have, for example, an MT (Mechanically Transferable) connector or the like having four optical fibers retained in the housing. Provided on the top surface of the optical connector 11 is the aforementioned projection 11a which engages with the engagement hole 1j of the receptacle 1.

The receptacle module which has the above-described structure is assembled by engaging the optical module 10 with the receptacle 1 in a detachable manner as follows.

First, as shown in FIGS. 1 and 2, the optical module 10 is placed facing the receptacle 1 and its main body 10a is inserted into the space formed by the top plate 1c, the side guides 1d and the bottom guide 1e of the receptacle 1. This causes the optical module 10 to be inserted into the inserting portion 1b formed by the top plate 1c, the side guides 1d and the bottom guide 1e in contact with those components of the receptacle 1 while being guided and positioned.

As the protruding portion 10f is fitted in the recess 1g formed lengthwise in the bottom guide 1e at this time, the optical module 10 is smoothly inserted into the receptacle 1.

Figure 3A:
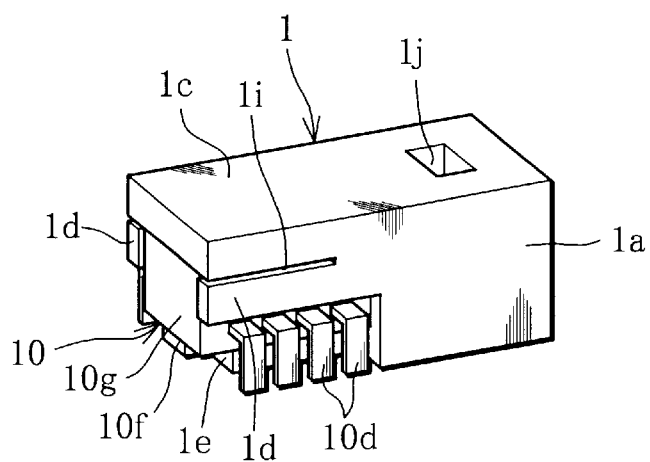
FIG. 3A is a perspective view of the receptacle module in FIG. 1 in which the optical module is fitted.
Figure 3B:
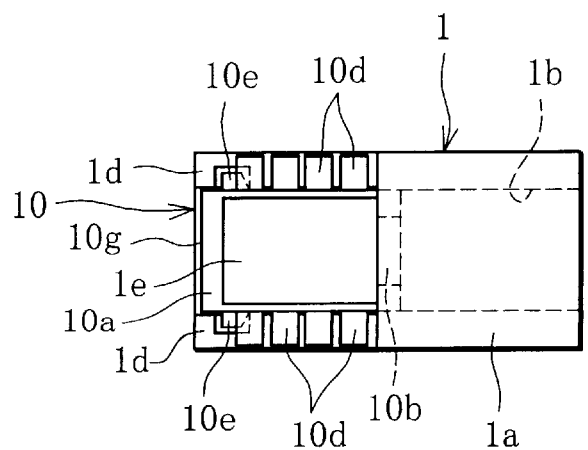
FIG. 3B is a bottom view of the receptacle module.

When the optical module 10 is inserted into the receptacle 1 to the end position, the protruding portion 10b is fitted in the inserting portion 1b and positioned and the projections 10e engage with the associated engagement portions 1f on the side guides 1d. This completes the assembly of the receptacle module. In the assembled receptacle module, therefore, the receptacle 1 can permit the optical module 10 to be positioned in the space formed by the top plate 1c, the side guides 1d and the bottom guide 1e and engaged and held there in a detachable manner, as shown in FIGS. 3A and 3B.

As the projections 10e of the optical module 10 on the receptacle side are tapered as shown in FIG. 1, the projections 10e smoothly engage with the associated engagement portions 1f at this time. The use of the projections 10e which are so shaped as to match with the engagement portions 1f can enhance the strength of engagement of the optical module 10 with the receptacle 1, thus making the optical module 10 hard to be disengaged from the receptacle 1.

Roughly speaking, the positioning of the receptacle 1 and the optical module 10 after assembling the receptacle module in the above-described manner is determined by the positional relationship between the top plate 1c, the side guides 1d and the bottom guide 1e and the main body 10a in an abutting state. More specifically, the positioning is determined by the positional relationship between the protruding portion 10b and the inserting portion 1b in which the protruding portion 10b is fitted.

When the optical connector 11 is connected to the optical module 10 via the receptacle 1, the receptacle module of this invention can ensure optical coupling with excellent optical characteristics, such as the inserting characteristic.

According to the receptacle module of this invention, one can easily detach the optical module 10 from the receptacle 1 by pulling the optical module 10 through the reverse steps to the above-described assembling steps while widening the two side guides 1d in the widthwise direction by holding the receptacle 1.

As apparent from the above, the receptacle 1 of the receptacle module of this embodiment is small, is simple in structure and is easily attachable to and detachable from the optical module 10.

A receptacle module according to the second embodiment will be discussed below. This receptacle module has a receptacle 5 and an optical module 10 shown in FIGS. 4 to 7B. This receptacle 5 has a cover 6.

The optical module and optical connector that are to be inserted into the receptacle 5 have the same structures as the optical module 10 and the optical connector 11 of the first embodiment except that the optical module 10 of the second embodiment does not have the projections 10e provided in the first embodiment. To avoid the redundant description, therefore, same reference numerals as used to denote the components of the optical module 10 and the optical connector 11 of the first embodiment are also given to the corresponding components of the second embodiment in the following description and the associated drawings.

Figure 4:
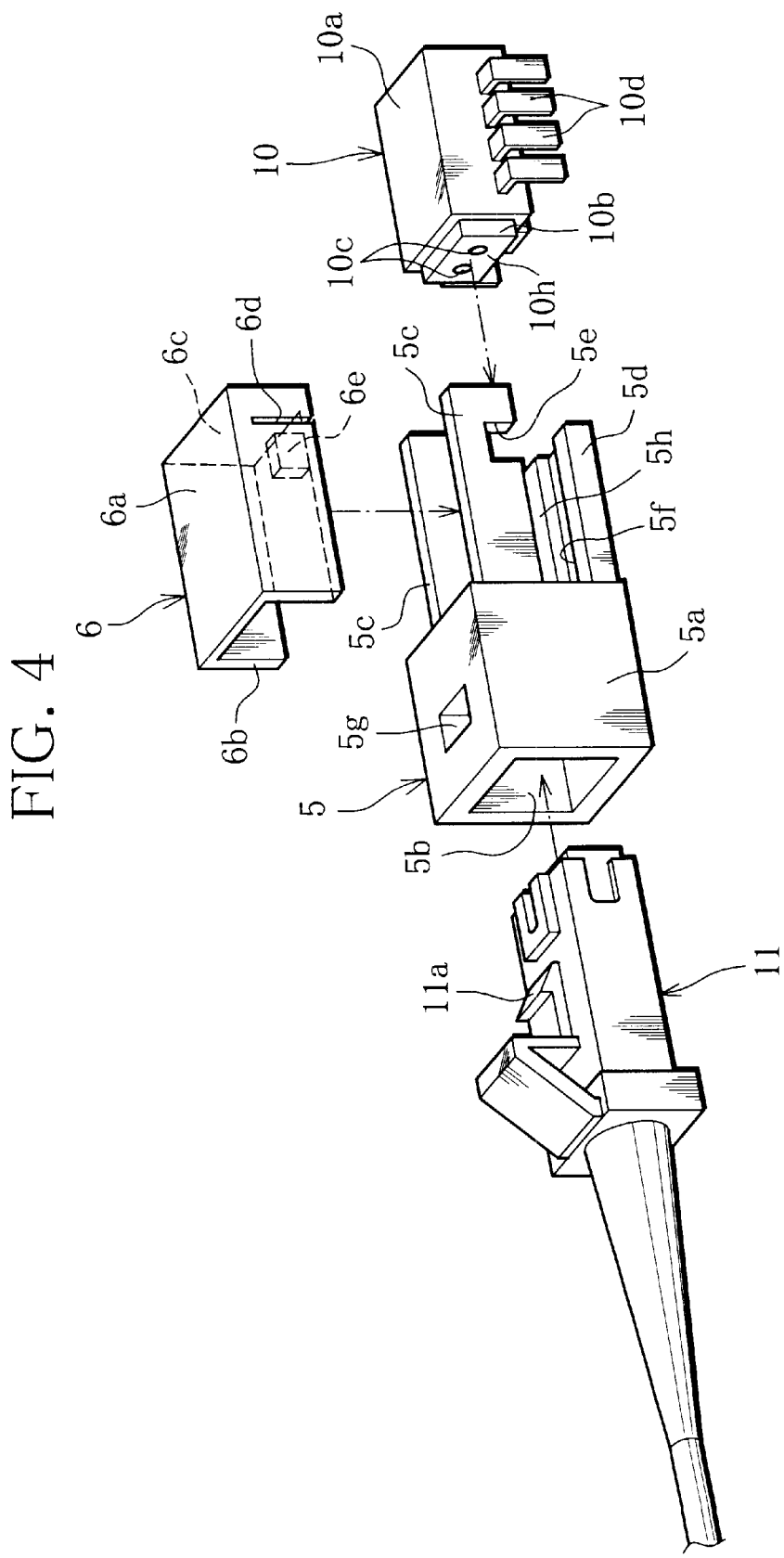
FIG. 4 is a perspective view of a receptacle module according to a second embodiment of this invention, illustrating how to attach an optical module and a cover from the receptacle side.
Figure 5:
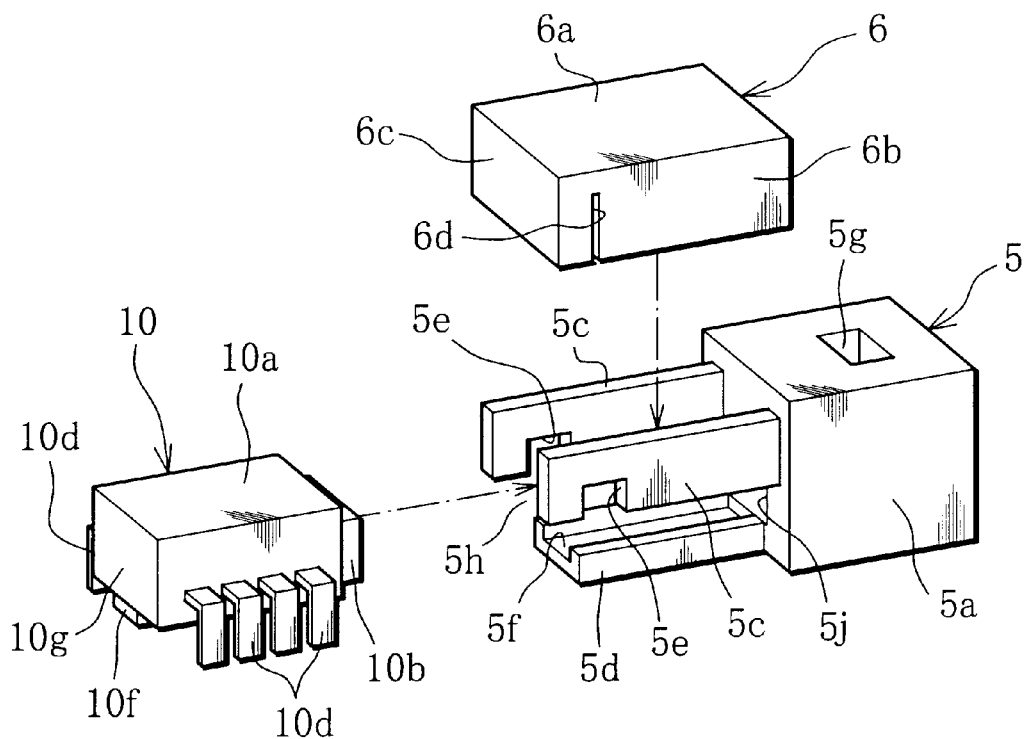
FIG. 5 is a perspective view of the receptacle module in FIG. 4 as seen from the optical module side.

The receptacle 5, which is formed of synthetic resin such as PPS, has an inserting portion 5b formed in the center of a main body 5a which is formed into a rectangular cylindrical shape by molding as shown in FIG. 4. The optical connector 11 is to be fitted into this inserting portion 5b. The receptacle 5 has an opening 5j (see FIGS. 5 and 8) formed in the opposite side to the inserting portion 5b where the optical module 10 is to be inserted. A protruding portion 10b of the optical module 10 is to be fitted into this opening 5j. The receptacle 5 has side guides 5c and a bottom guide 5d provided on the main body 5a integrally along the direction of connection between the optical connector 11 and the optical module 10, i.e., along the lengthwise direction. The side guides 5c extend from the two widthwise sides of the main body 5a. The bottom guide 5d extends from the bottom portion of the main body 5a. Each side guide 5c, which serves as a first positioning member, has a recess 5e formed in approximately the lower center portion. This recess 5e is to be engaged with an associated projection 6e of the cover 6, which will be discussed later. As shown in FIGS. 4 and 5, a recess 5f, which serves as a second positioning member, is formed in the top center portion of the bottom guide 5d along the lengthwise direction. The bottom guide 5d is formed narrower than the main body 5a of the receptacle 5 so that at the time the optical module 10 is attached or detached, leads 10d protruding on both widthwise sides of the optical module 10 do not touch the bottom guide 5d. As shown in FIG. 4, the side guides 5c and the bottom guide 5d form an inserting portion 5h which is the space where the optical module 10 is to be inserted. The side guides 5c and the bottom guide 5d together with the cover 6 hold the optical module 10 inserted into the inserting portion 5h. The optical connector 11 and the optical module 10 are accurately positioned as they are respectively inserted into the inserting portions 5b and 5h. The receptacle 5 has an engagement hole 5g formed in the top of the main body 5a where a projection 11a of the optical connector 11 is engaged.

Figure 6:
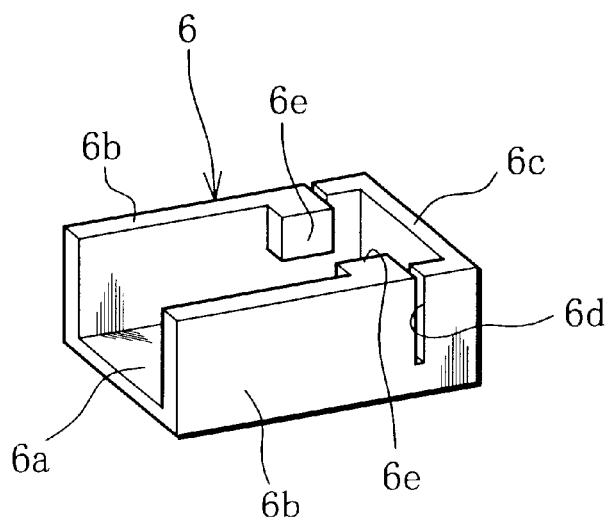
FIG. 6 is a perspective view showing a cover, bottom-side up, which is used in the receptacle module in FIG. 4.

The cover 6 has a top plate 6a, two side plates 6b and a rear plate 6c, as shown in FIGS. 4 to 6. Each side plate 6b has a slit 6d cut upward (in the direction perpendicular to the surface of the top plate 6a) from the bottom end and a projection 6e formed inside. While the cover 6 is formed of a synthetic resin having a high moldability or metal, it is particularly formed of a material having a high thermal conductivity, such as copper, aluminum, copper alloy or aluminum alloy, in this example.

The receptacle module which has the above-described structure is assembled by engaging the optical module 10 with the receptacle 5 in a detachable manner as follows.

First, as shown in FIGS. 4 and 5, the optical module 10 is placed facing the receptacle 5 and its main body 10a is inserted into the space formed by the side guides 5c and the bottom guide 5d of the receptacle 5. This causes the optical module 10 to be inserted into the space formed by the side guides 5c and the bottom guide 5d in contact with those components of the receptacle 5 while being guided and positioned.

As the protruding portion 10f is fitted in the recess 5f formed lengthwise in the bottom guide 5d at this time, the optical module 10 is smoothly inserted into the receptacle 5.

When the optical module 10 is inserted into the receptacle 5 to the end position, the protruding portion 10b is fitted in the opening 5j and positioned there.

Figure 7A:
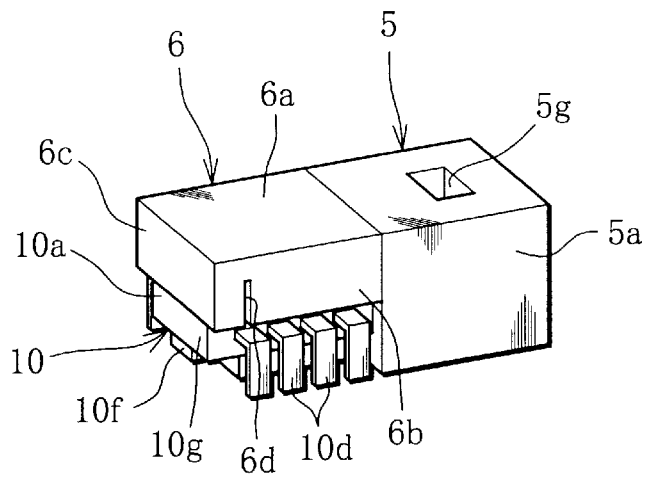
FIG. 7A is a perspective view of the receptacle module in FIG. 4 which has the optical module and the cover attached together.
Figure 7B:
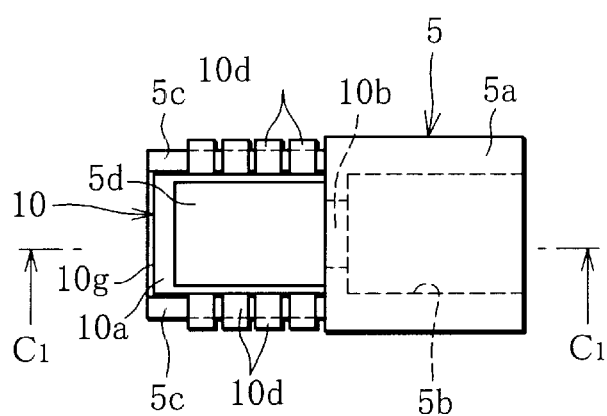
FIG. 7B is a bottom view of the receptacle module.

Next, as shown in FIGS. 4 and 5, the cover 6 is placed over the side guides 5c and the optical module 10 from above, the projections 6e provided on the side plates 6b are engaged with the respective recesses 5e of the side guides 5c, thus completing the assembling of the receptacle module. With the receptacle module assembled, the top plate 6a covers the side guides 5c and the top of the optical module 10 and contacts the optical module 10, as shown in FIGS. 7A and 7B. The side plates 6b cover the side guides 5c and the optical module 10, held between the side guides 5c, from both widthwise sides.

Figure 8:
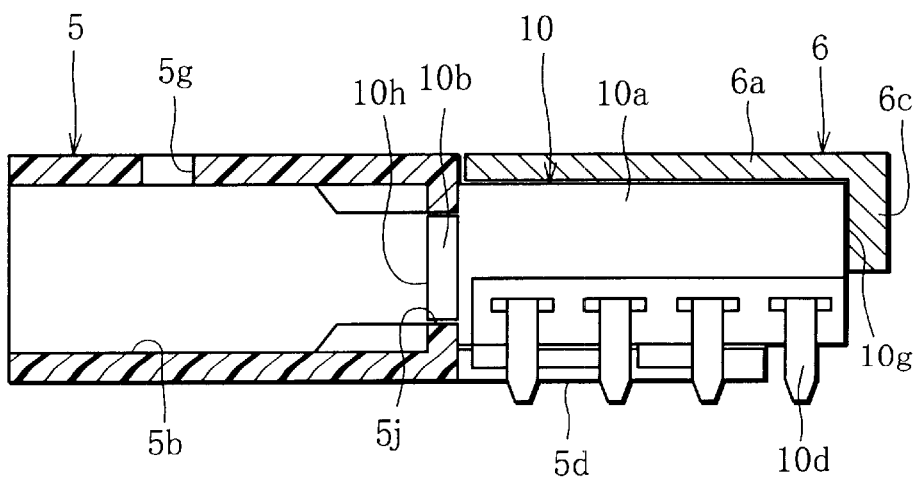
FIG. 8 is a partly cross-sectional view of the receptacle module showing only the main body of the receptacle and the cover in cross section along the line C1—C1 in FIG. 7B.

As shown in FIG. 8, the rear plate 6c of the cover 6 covers the distal end portions of the side guides 5c and the rear end face 10g of the optical module 10 and presses the rear end face 10g in the inserting direction of the receptacle 5. As a result, the receptacle 5 can hold the optical module 10 inserted in the space between the side guides 5c, the bottom guide 5d and the cover 6, as shown in FIGS. 7A, 7B and 8, so that the entire optical module 10 can securely be positioned to the receptacle 5. What is more, as the rear plate 6c of the cover 6 presses the rear end face 10g of the optical module 10, the cover 6 can permit the protruding portion 10b of the optical module 10 to be accurately fitted in the inserting portion 5b of the receptacle 5 at a predetermined position as per the first embodiment.

FIG. 7B does not show the cover 6 and FIG. 8 shows only the receptacle 5 and the cover 6 in a broken-away view.

One can pull out and easily detach the optical module 10 from between the side guides 5c and the bottom guide 5d of the receptacle 5 by removing the cover 6 through the reverse steps to the above-described assembling steps while widening the two side plates 6b. At this time, the slits 6d formed in the side plates 6b of the cover 6 can allow the side plates 6b to be easily widened.

As apparent from the above, like the receptacle 1, the receptacle 5 of the receptacle module of this embodiment is small, is simple in structure and is easily attachable to and detachable from the optical module 10. Further, as the receptacle 5 encloses the optical module 10 with the help of the cover 6, the receptacle 5 can hold the optical module 10 more firmly than the receptacle 1 of the first embodiment.

Figure 9:
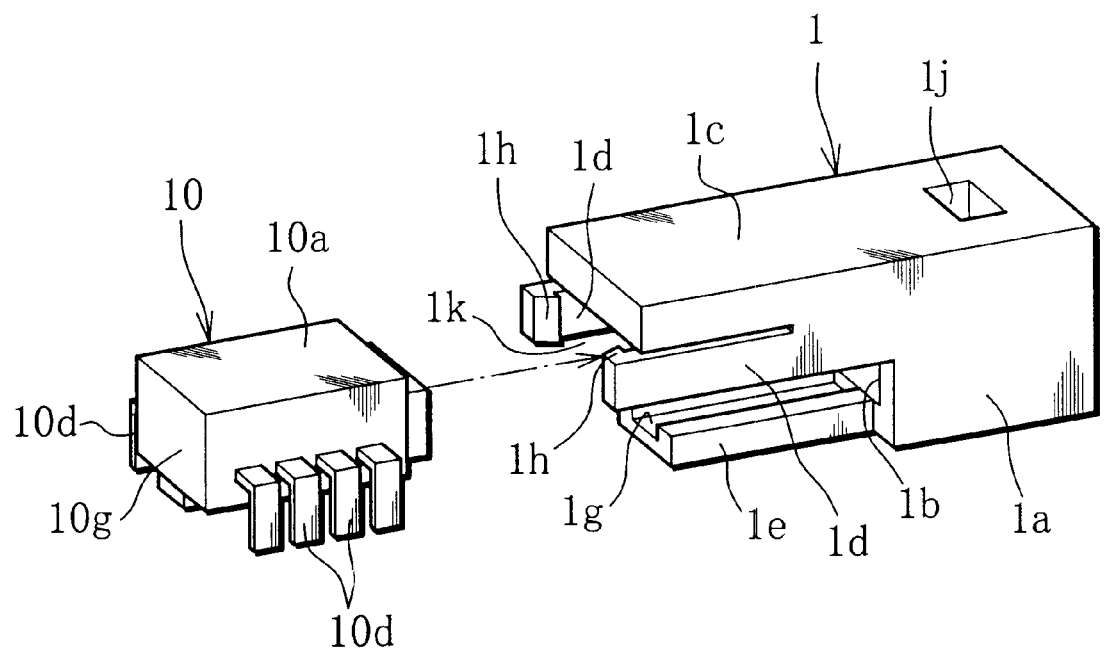
FIG. 9 is a perspective view of a receptacle module according to a third embodiment of this invention, illustrating how to insert an optical module from the receptacle side.
Figure 10:
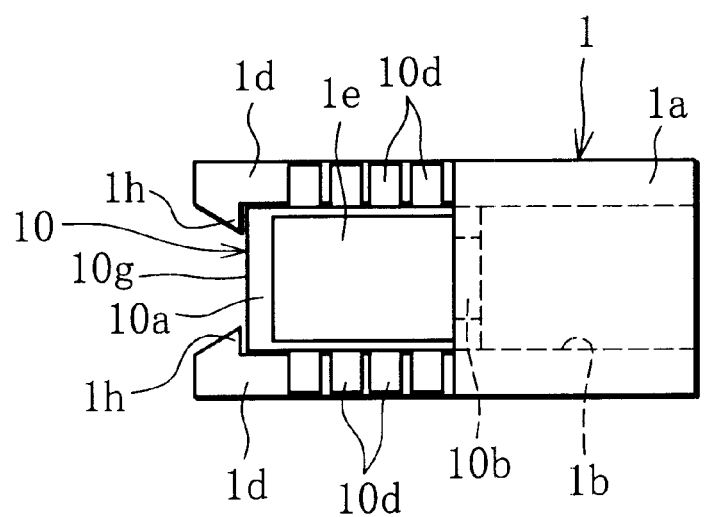
FIG. 10 is a bottom view of the receptacle module in FIG. 9 in which the optical module is fitted.

The receptacle 1 may have an engagement claw 1h formed at the distal end of each side guide 1d in place of the recessed engagement portion 1f, as shown in FIGS. 9 and 10.

With the receptacle 1 designed this way, when the optical module 10 is inserted into the space formed by the top plate 1c, the side guides 1d and the bottom guide 1e of the receptacle 1, the engagement claws 1h formed on the side guides 1d are pressed widened by the side faces of the optical module 10. When the insertion of the optical module 10 is completed, the engagement claws 1h of the receptacle 1 engage with the rear end portion of the optical module 10, as shown in FIG. 10, thus holding the optical module 10 more firmly.

According to the receptacle module of this invention which is constructed in the above-described manner, the optical module 10 is inserted into the receptacle 1 or the receptacle 5 beforehand, and is then mounted on a printed wiring board.

As the receptacle module of this invention can ensure easy attachment and detachment of the optical module, however, it is possible to later insert the receptacle into the optical module which has been mounted on the printed wiring board, such as the PWB (Printed Wiring Board) beforehand or detach only the receptacle from the PWB.

Figure 11A:
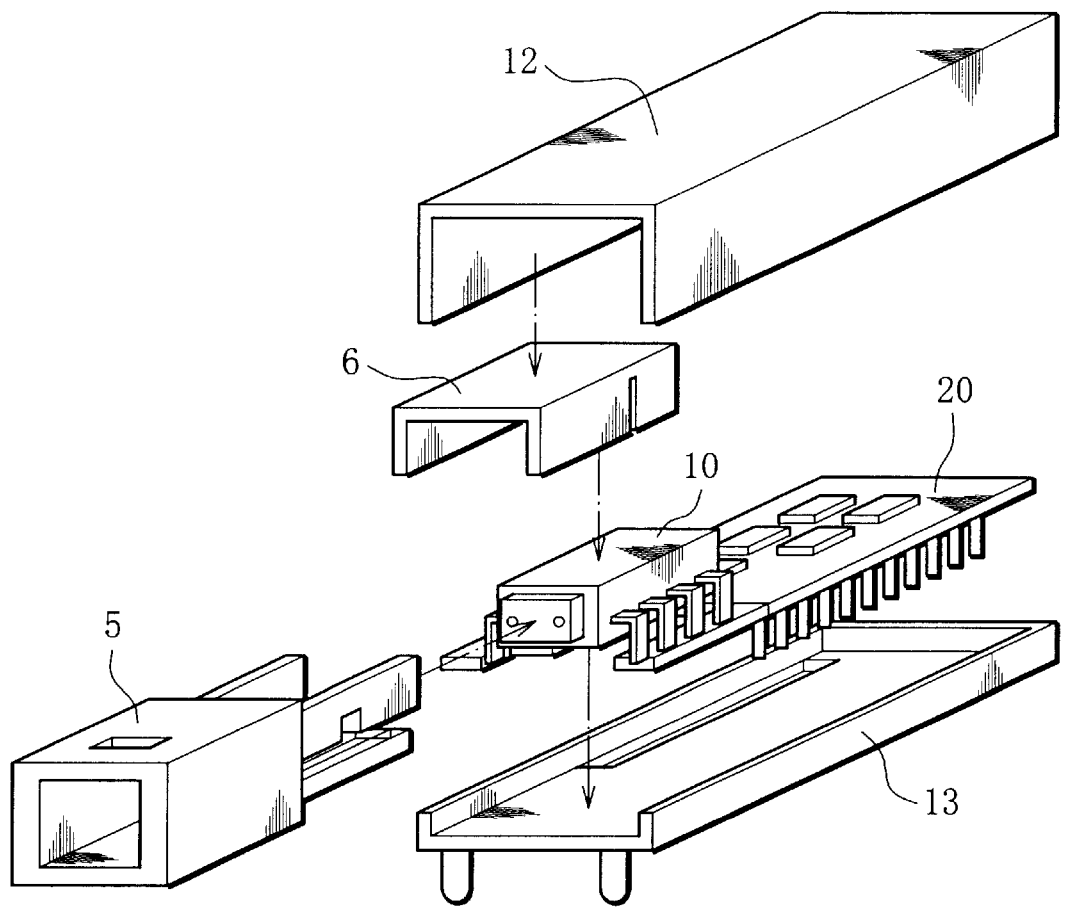
FIG. 11A is an exploded perspective view for explaining an example of mounting a receptacle module using the receptacle in FIG. 4 on a printed wiring board.
Figure 11B:
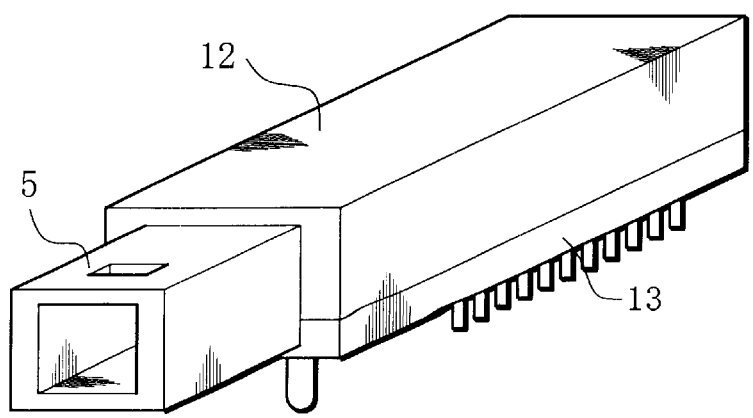
FIG. 11B is a perspective view showing the receptacle module mounted on the printed wiring board.

With the optical module 10 mounted on a printed wiring board 20 beforehand, for example, the receptacle 5 may be inserted in the optical module 10 later and the cover 6 is put, as shown in FIG. 11A. Then, the printed wiring board 20 is held between substrate covers 12 and 13, thus yielding a printed wiring board-attached receptacle module as shown in FIG. 11B. Removing the substrate cover 12 and the cover 6 can allow the receptacle 5 to be easily detached from the printed wiring board 20 with the optical module 10 mounted on the printed wiring board 20.

As apparent from the above, the use of the receptacle module of this invention provides a greater modes of mounting an optical module on a printed wiring board or the like and thus increases the degree of mounting freedom.

The optical module 10 incorporates a laser diode or an IC, which becomes a heat generating source. In the mounting example shown in FIGS. 11A and 11B, the bottom surface of the top plate 6a of the cover 6 which has an excellent thermal conductivity contacts the optical module 10 and the top surface of the top plate 6a contacts the substrate cover 12 at the time the receptacle module is mounted on the substrate. This can allow the optical module 10 to let the heat generated from a component, such as a laser diode or an IC to efficiently escape outside via the cover 6 and the substrate cover 12. It is preferable that the substrate cover 12 is formed of a high-thermal-conductive material, such as copper or aluminum, which has an excellent thermal conductivity. This improves the heat discharging performance, favorably.

From the viewpoint of the heat discharging performance of the optical module 10, it is most preferable that the entire cover 6 is made of a material with an excellent thermal conductivity as in the second embodiment. Alternatively, only that portion of the cover 6 which contacts the optical module 10 may be formed of a material having a high thermal conductivity, such as copper or aluminum, and the other portion may be formed of a hard resin having a high moldability.

Although a recess is formed in the bottom guide of the receptacle and a protruding portion is formed on the optical module 10 in each embodiment described above, it is possible to form a protruding portion on the bottom guide and a recess in the optical module and then fit the former into the latter.

The receptacle module of this invention is not limited to the above-described embodiments, but may be modified in various other forms without departing from the scope of the invention.

What is claimed is:

1. A receptacle module comprising:

an optical module having a plurality of leads and having a photoelectric converting capability; and a receptacle for connecting said optical module to an optical connector, said receptacle including a first positioning member for positioning said optical module, said first positioning member extending from both widthwise-directional sides of said receptacle along a direction of connection between said optical connector and said optical module, and a second positioning member extending from a bottom portion of a main body of said receptacle such that said optical module is positioned between said first and second positioning members, said second positioning member having a width smaller than that of said receptacle, wherein said receptacle detachably holds said optical module by engagement with said optical module, and at least one of said first and second positioning members supports said optical module over substantially an entire length thereof, wherein said first positioning member is formed as part of a side portion of said receptacle and is partly separated from the main body of said receptacle by a slit extending in an attaching and detaching direction of said optical module, wherein said slit is located on at least one of the widthwise sides of said receptacle, and wherein said slit imparts elasticity to said first positioning member in a width direction of said receptacle and thereby facilitates attachment and detachment of said optical module to and from said receptacle.

2. The receptacle module according to claim 1, wherein said slit is formed in both side portions of said receptacle.

3. The receptacle module according to claim 1, wherein said first positioning member has an engagement portion for engaging with a projection formed on said optical module.

4. The receptacle module according to claim 3, wherein said projection is formed on a rear end portion of said optical module.

5. The receptacle module according to claim 1, further comprising a cover to be engaged with said receptacle, said cover having side plates for covering said first positioning member from both widthwise-directional sides, a top plate for covering a top portion of said first positioning member, and a rear plate for covering a distal end portion of said first positioning member, wherein, with said optical module held between said first and second positioning members, said first positioning member and said optical module are covered with said cover, and with said cover engaged with said receptacle, said optical module is held and positioned with respect to said receptacle.

6. The receptacle module according to claim 5, wherein said side plates have slits formed in a height direction of said cover, said slits imparting elasticity to said side plates in a width direction of said cover and thereby facilitating attachment and detachment of said cover to and from said receptacle module.

7. The receptacle module according to claim 5, wherein a heat discharging portion of a thermal conductive material is provided on at least part of said cover, and said heat discharging portion and said optical module are secured in contact with each other.

8. The receptacle module according to claim 1, wherein said optical module has a protruding portion protruding from a front end face thereof and having an end face to be optically coupled to said optical connector, and said receptacle has an inserting portion formed inside, which is to be fitted over said protruding portion, said receptacle and said optical module are positioned relative to each other by said positioning portion and are positioned more accurately by said protruding portion fitted into said inserting portion.

9. A receptacle module comprising:

an optical module having a plurality of leads extending from both sides thereof and having a photoelectric converting capability; and a receptacle to be used for connecting said optical module to an optical connector, wherein said receptacle has a first positioning member for positioning said optical module, said first positioning member extending from both widthwise-directional sides of said receptacle along a direction of connection between said optical connector and said optical module, and a second positioning member extending from a bottom portion of a main body of said receptacle such that said optical module is positioned between said first and second positioning members, said second positioning member being formed narrower than a width of said receptacle, said receptacle detachably holding said optical module by engagement with said plurality of leads located on both sides of said second positioning member;

a cover to be engaged with said receptacle, said cover having side plates for covering said first positioning member from both widthwise-directional sides, a top plate for covering a top portion of said first positioning member, and a rear plate for covering a distal end portion of said first positioning member, wherein, with said optical module held between said first and second positioning members, said first positioning member and said optical module are covered with said cover, and with said cover engaged with said receptacle, said optical module is held and positioned with respect to said receptacle.

10. The receptacle module according to claim 9, wherein said side plates have slits formed in a height direction.

11. The receptacle module according to claim 9, wherein a heat discharging portion of a thermal conductive material is provided on at least part of said cover, and said heat discharging portion and said optical module are secured in contact with each other.

* * * * *